United States Patent
Sekar et al.

(10) Patent No.: US 11,526,544 B2
(45) Date of Patent: Dec. 13, 2022

(54) SYSTEM FOR OBJECT IDENTIFICATION

(71) Applicant: International Business Machines Corporation, Armonk, NY (US)

(72) Inventors: Deepak Sekar, Chennai (IN); Anil Manohar Omanwar, Vikas Nagar (IN); Drew Johnson, Cottesloe (AU); Salil Ahuja, Madison, WI (US)

(73) Assignee: International Business Machines Corporation, Armonk, NY (US)

( * ) Notice: Subject to any disclaimer, the term of this patent is extended or adjusted under 35 U.S.C. 154(b) by 154 days.

(21) Appl. No.: 16/868,608

(22) Filed: May 7, 2020

(65) Prior Publication Data

US 2021/0349931 A1 Nov. 11, 2021

(51) Int. Cl.
G06F 16/48 (2019.01)
G06F 16/432 (2019.01)
G06N 3/08 (2006.01)
G06F 16/45 (2019.01)

(52) U.S. Cl.
CPC ............ *G06F 16/434* (2019.01); *G06F 16/45* (2019.01); *G06F 16/48* (2019.01); *G06N 3/08* (2013.01)

(58) Field of Classification Search
CPC ........ G06F 16/434; G06F 16/45; G06F 16/40; G06F 16/48; G06F 16/43
See application file for complete search history.

(56) References Cited

U.S. PATENT DOCUMENTS

| | | |
|---|---|---|
| 6,236,958 B1 | 5/2001 | Lange |
| 7,054,803 B2 | 5/2006 | Eisele |
| 8,787,618 B2 | 7/2014 | Tokutake |
| 8,867,891 B2 | 10/2014 | Jiang |
| 9,571,890 B1 * | 2/2017 | Diamondstein .... H04N 21/2387 |
| 2007/0255755 A1 * | 11/2007 | Zhang ..................... G06F 16/78 |
| 2008/0126092 A1 | 5/2008 | Kawazoe |

(Continued)

FOREIGN PATENT DOCUMENTS

| | | |
|---|---|---|
| AU | 714213 B2 | 12/1999 |
| KR | 100743485 B1 | 7/2007 |

OTHER PUBLICATIONS

Ganapathi et al., "Video Pre-Processing of Image Information for Vehicle Identification", Research Gate, International Journal of Engineering Science and Technology (IJEST), vol. 3, No. 2, Feb. 2011, 11 pages.

(Continued)

*Primary Examiner* — Vaishali Shah
(74) *Attorney, Agent, or Firm* — Aaron N. Pontikos (57) ABSTRACT

A multidimensional system for generating a multimedia search engine is provided. A computer device identifies a plurality of independently separable aspects of a multimedia file. The computing device provides at least one independently separable aspect of the plurality of independently separable aspects as input into an object detection model. The computing device receives, from the object detection model, an identification of at least one object and a corresponding level of confidence that the object is present in the multimedia file. The computing device classifies the object as either confident or not confident, based on whether the level of confidence meets a threshold level of confidence. The computing device generates a multimedia search engine based, at least in part, on the object and the classification.

20 Claims, 6 Drawing Sheets

(56) References Cited

U.S. PATENT DOCUMENTS

| | | | |
|---|---|---|---|
| 2009/0310021 A1* | 12/2009 | Kondo | H04N 21/4355 348/E9.055 |
| 2011/0196888 A1* | 8/2011 | Hanson | G06F 16/58 707/769 |
| 2014/0050355 A1* | 2/2014 | Cobb | G06V 20/41 382/103 |
| 2015/0067471 A1* | 3/2015 | Bhardwaj | G06F 16/5862 715/233 |
| 2018/0034879 A1* | 2/2018 | Chegini | H04L 65/4092 |
| 2018/0053329 A1* | 2/2018 | Roberts | G06T 19/00 |
| 2018/0181593 A1* | 6/2018 | Ranzinger | G06V 10/44 |
| 2018/0276841 A1* | 9/2018 | Krishnaswamy | G06V 10/82 |
| 2019/0272425 A1* | 9/2019 | Tang | G06F 16/532 |
| 2019/0354603 A1* | 11/2019 | Selim | G06F 40/40 |
| 2019/0354744 A1* | 11/2019 | Chaloux | G06F 16/3334 |
| 2020/0159759 A1* | 5/2020 | Younessian | G06F 16/41 |
| 2020/0160105 A1* | 5/2020 | Kehl | G06K 9/6262 |
| 2020/0192961 A1* | 6/2020 | Safronov | G06K 9/623 |

OTHER PUBLICATIONS

Hiremath et al., "Character Recognition of Video Subtitles", ICTACT Journal on Image and Video Processing, Nov. 2016, vol. 07, Issue: 02, 6 pages.

Mell et al., "The NIST Definition of Cloud Computing", Recommendations of the National Institute of Standards and Technology, NIST Special Publication 800-145, Sep. 2011, 7 pages.

Oliveira et al., "Image Processing Techniques for Video Content Extraction", European Research Consortium for Informatics and Mathematics, Aug. 28-30, 1997, 10 pages.

Yan et al., "Deep Correlation for Matching Images and Text", Computer Vision Foundation, 2015, 10 pages.

* cited by examiner

SYSTEM FOR OBJECT IDENTIFICATION

BACKGROUND OF THE INVENTION

The present invention relates generally to the field of digital media, and more particularly to using neural networks to identify objects in digital media.

In general, image recognition can be utilized for object recognition in digital media formats. Often, the object recognition is used to annotate the digital media with respect to the identified objects, which can lead to a lack of perspective towards the various dimensions in which an object appears in the digital media.

SUMMARY

Embodiments of the present invention provide a method, system, and program product for generating a multimedia search engine.

A first embodiment encompasses a method for generating a multimedia search engine. One or more processors identify a plurality of independently separable aspects of a multimedia file. The one or more processors identify a plurality of independently separable aspects of a multimedia file. The one or more processors provide at least one independently separable aspect of the plurality of independently separable aspects as input into an object detection model. The one or more processors receive from the object detection model, an identification of at least one object and a corresponding level of confidence that the object is present in the multimedia file. The one or more processors classify the object as either confident or not confident, based on whether the level of confidence meets a threshold level of confidence. The one or more processors generate a multimedia search engine based, at least in part, on the object and the classification.

A second embodiment encompasses a computer program product for generating a multimedia search engine. The computer program product includes one or more computer-readable storage media and program instructions stored on the one or more computer-readable storage media. The program instructions include program instructions to identify a plurality of independently separable aspects of a multimedia file. The program instructions include program instructions to provide at least one independently separable aspect of the plurality of independently separable aspects as input into an object detection model. The program instructions to include program instructions to receive from the object detection model, an identification of at least one object and a corresponding level of confidence that the object is present in the multimedia file. The program instructions include program instructions to classify the object as either confident or not confident, based on whether the level of confidence meets a threshold level of confidence. The program instructions include program instructions to generate a multimedia search engine based, at least in part, on the object and the classification.

A third embodiment encompasses a computer system for generating a multimedia search engine. The computer system includes one or more computer processors, one or more computer-readable storage media, and program instructions stored on the computer-readable storage media for execution by at least one of the one or more processors. The program instructions include program instructions to identify a plurality of independently separable aspects of a multimedia file. The program instructions include program instructions to provide at least one independently separable aspect of the plurality of independently separable aspects as input into an object detection model. The program instructions to include program instructions to receive from the object detection model, an identification of at least one object and a corresponding level of confidence that the object is present in the multimedia file. The program instructions include program instructions to classify the object as either confident or not confident, based on whether the level of confidence meets a threshold level of confidence. The program instructions include program instructions to generate a multimedia search engine based, at least in part, on the object and the classification.

DETAILED DESCRIPTION

Detailed embodiments of the present invention are disclosed herein with reference to the accompanying drawings. It is to be understood that the disclosed embodiments are merely illustrative of potential embodiments of the present invention and may take various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

While possible solutions for object detection within multimedia files may be known, these solutions may be inadequate for easily and accurately identifying which objects are actually present within a multimedia file. Embodiments of the present invention recognize that such solutions can be improved by analyzing one or more entities (or "independently separable aspects") associated with the multimedia and correlating the one or more entities with one or more objects present in the multimedia, and then generating a multimedia search engine using the one or more objects. By generating such a multimedia search engine, embodiments of the present invention allow for users to readily access information and data related to the multimedia, which can be leveraged by users to adequately make informed decisions and maintain updates on relevant information and data.

The present invention will now be described in detail with reference to the Figures.

Figure 1:
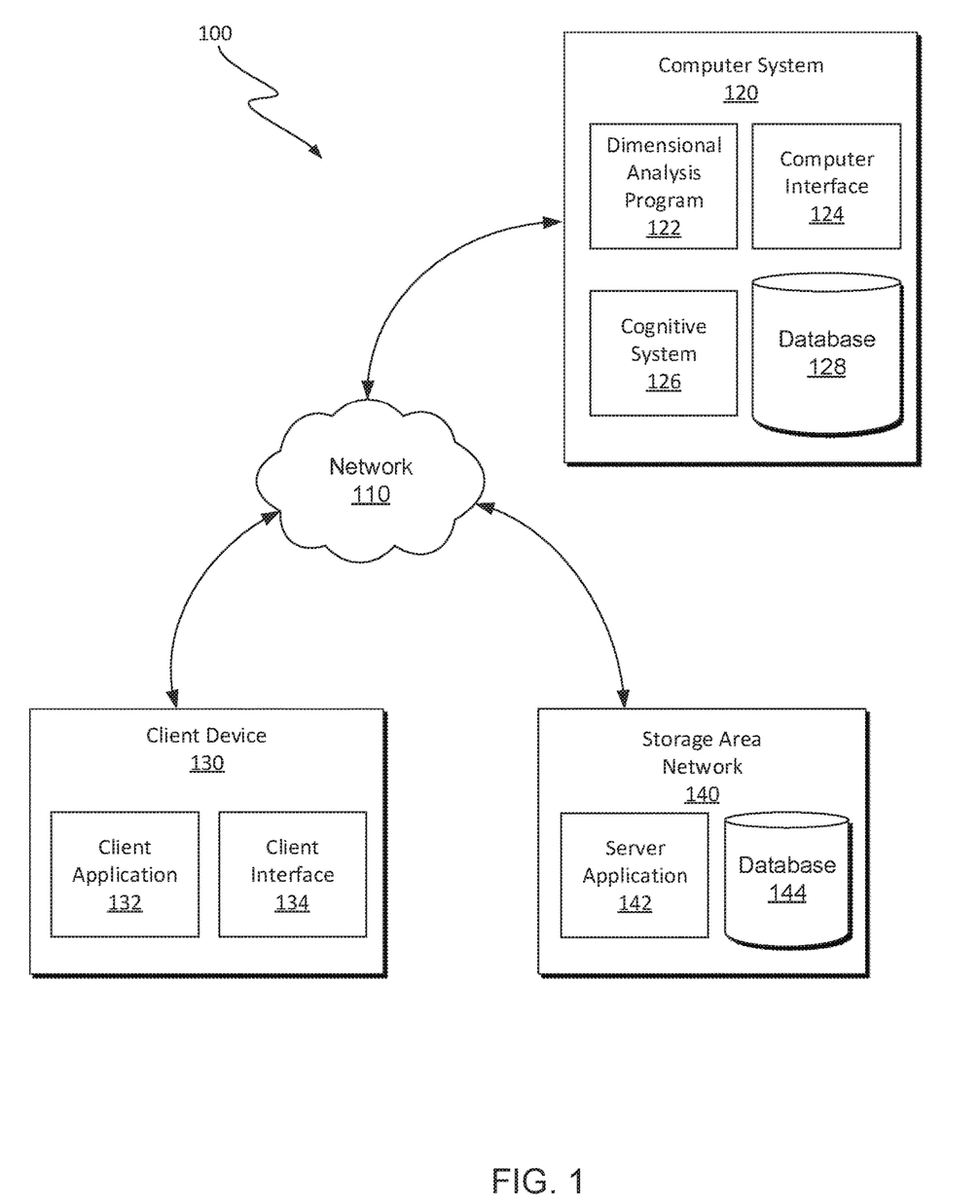
FIG. 1 is a functional block diagram illustrating a computing environment, in which a computing device generates a multimedia search engine through machine learning, accordance with an exemplary embodiment of the present invention.

FIG. 1 is a functional block diagram illustrating computing environment, generally designated 100, in accordance with one embodiment of the present invention. Computing environment 100 includes computer system 120, client device 130, and storage network (SAN) 140 connected over network 110. Computer system 120 includes dimensional analysis program 122, computer interface 124, cognitive system 126 and database 128. Client device 130 includes client application 132 and client interface 134. Storage Area Network (SAN) 140 includes server application 142 and database 144.

In various embodiments of the present invention, computer system 120 is a computing device that can be a standalone device, a server, a laptop computer, a tablet computer, a netbook computer, a personal computer (PC), a personal digital assistant (PDA), a desktop computer, or any programmable electronic device capable of receiving, sending, and processing data. In general, computer system 120 represents any programmable electronic device or combination of programmable electronic devices capable of executing machine readable program instructions and communications with various other computer system (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing dimensional analysis program 122, computer interface 124, cognitive system 126, and database 128. Computer system 120 may include internal and external hardware components, as described in further detail with respect to FIG. 1.

In this exemplary embodiment, dimensional analysis program 122, computer interface 124, and database 128 are stored on computer system 120. However, in other embodiments, dimensional analysis program 122, computer interface 124, and database 128 are stored externally and accessed through a communication network, such as network 110. Network 110 can be, for example, a local area network (LAN), a wide area network (WAN) such as the Internet, or a combination of the two, and may include wired, wireless, fiber optic or any other connection known in the art. In general, network 110 can be any combination of connections and protocols that will support communications between computer system 120, client device 130, SAN 140, and various other computer systems (not shown), in accordance with desired embodiment of the present invention.

In various embodiments of the present invention, the various other computer systems (not shown) can be a standalone device, a server, a laptop computer, a tablet computer, a netbook computer, a personal computer (PC), a desktop computer, or any programmable electronic device capable of receiving, sending, and processing data. In another embodiment, the various other computer systems represent a computing system utilizing clustered computers and components to act as a single pool of seamless resources. In general, the various other computer systems can be any computing device or combination of devices with access to computer system 120, client device 130, SAN 140 and network 110 and is capable of executing domain review program 122, computer interface 124, and database 128. The various other computer systems may include internal and external hardware components as depicted and described in further detail with respect to FIG. 1.

In the embodiment depicted in FIG. 1, dimensional analysis program 122, at least in part, has access to client application 132 and can communicate data stored on computer system 120 to client device 130, SAN 140, and various other computer systems (not shown). More specifically, dimensional analysis program 122 defines a user of computer system 120 that has access to data stored on client device 130 and/or database 144.

Dimensional analysis program 122 is depicted in FIG. 1 for illustrative simplicity. In various embodiments of the present invention, dimensional analysis program 122 represents logical operations executing on computer system 120, where computer interface 124 manages the ability to view these logical operations that are managed and executed in accordance with dimensional analysis program 122. In some embodiments, dimensional analysis program 122 represents a cognitive AI system that processes and analyzes input and output (I/O). Additionally, dimensional analysis program 122, when executing cognitive AI processing, operates to learn from the I/O that was analyzed and generates a dictionary entry based on, but not limited to, the analyzation operation.

Computer system 120 includes computer interface 124. Computer interface 124 provides an interface between computer system 120, client device 130, and SAN 140. In some embodiments, computer interface 124 can be a graphical user interface (GUI) or a web user interface (WUI) and can display text, documents, web browsers, windows, user options, application interfaces, and instructions for operation, and includes the information (such as graphic, text, and sound) that a program presents to a user and the control sequences the user employs to control the program. In some embodiments, computer system 120 accesses data communicated from client device 130 and/or SAN 140 via a client-based application that runs on computer system 120. For example, computer system 120 includes mobile application software that provides an interface between computer system 120, client device 130, and SAN 140.

In various embodiments, client device 130 is a computing device that can be a standalone device, a server, a laptop computer, a tablet computer, a netbook computer, a personal computer (PC), a personal digital assistant (PDA), a desktop computer, or any programmable electronic device capable of receiving, sending and processing data. In general, computer system 120 represents any programmable electronic device or combination of programmable electronic devices capable of executing machine readable program instructions and communications with various other computer systems (not shown). In another embodiment, computer system 120 represents a computing system utilizing clustered computers and components to act as a single pool of seamless resources. In general, computer system 120 can be any computing device or a combination of devices with access to various other computing systems (not shown) and is capable of executing client application 132 and computer interface 134. Computer system 120 may include internal and external hardware components, as described in further detail with respect to FIG. 6.

Client application 132 is depicted in FIG. 1 for illustrative simplicity. In various embodiments of the present invention, client application 132 represents logical operations executing on client device 130, where client interface 134 manages the ability to view these logical operations that are managed and executed in accordance with client application 132. In various embodiments, client application 132 defines a user of client device 130 that has access to data stored on computer system 120 and/or database 142.

Storage area network (SAN) 140 is a storage system that includes server application 142 and database 144, SAN 140 may include one or more, but is not limited to, computing devices, servers, serer-clusters, web-serves, databases and storage devices. SAN 140 operates to communicate with computer system 120, client device 130, and various other computing devices (not shown) over a network, such as network 110. For example, SAN 140 communicates with dimensional analysis program 122 to transfer data between computer system 120, client device 130, and various other computing devices (not shown) that are connected to network 110. SAN 140 can be any computing device or a combination of devices that are communicatively connected to a local IoT network, i.e., a network comprised of various computing devices including, but are not limited to computer system 120 and client device 130 to provide the functionality described herein. SAN 140 can include internal and external hardware components as described with respect to FIG. 6. The present invention recognizes that FIG. 1 may include any number of computing devices, servers, databases, and/or storage devices, and the present invention is not limited to only what is depicted in FIG. 1. As such, in some embodiments, some or all of the features and functions of SAN 140 are included as part of computer system 120, client device 130 and/or another computing device. Similarly, in some embodiments, some of the features of computer system 120 are included as part of SAN 140 and/or another computing device.

Additionally, in some embodiments, SAN 140 represents, or is part of, a cloud computing platform. Cloud computing is a model or service delivery for enabling convenient, on demand network access to a shared pool of configurable computing resources (e.g., networks, network bandwidth, servers, processing, memory, storage, applications, virtual machines, and service(s) that can rapidly provisioned and released with minimal management effort or interaction with a provider of a service. A cloud model may include characteristics such as on-demand self-service, broad network access, resource pooling, rapid elasticity, and measured service, can be represented by service models including a platform as a service (PaaS) model, an infrastructure as a service (IaaS) model, and a software as a service (SaaS) model, and can be implemented as various deployment models including as a private cloud, a community cloud, a public cloud, and a hybrid cloud.

SAN 140 is depicted in FIG. 1 for illustrative simplicity. However, it is to be understood that, in various embodiments, SAN 140 can include any number of databases that are managed in accordance with the functionality of server application 142. In general, database 144 represents data and server application 142 represents code that provides an ability to take specific action with respect to another physical or virtual resource and manages the ability to use and modify the data. In an alternative embodiment, dimensional analysis program 122 can also represent any combination of the aforementioned features, in which server application 142 has access to database 144. To illustrate various aspects of the present invention, examples of server application 142 are presented in which dimensional analysis program 122 represents one or more of, but is not limited to, a local IoT network.

In some embodiments, server application 142 and database 144 are stored on SAN 140. However, in various embodiments, server application 142 and database 144 may be stored externally and accessed through a communication network, such as network 110, as discussed above.

Dimensional analysis program 122 and cognitive system 126 are depicted in FIG. 1 for illustrative simplicity, computer system 120, however, can include any number of logics and/or programs that are managed in accordance with dimensional analyzation program 122. In general, computer system 120 manages access to dimensional analysis program 122, which represents a physical or virtual resource. In some embodiments, dimensional analysis program 122 includes certain information and cognitive system 126 represents code that, when executed, enables computer system 120 to take specific action with respect to another physical resource and/or virtual resource based on, but not limited to, that certain information. In other words, in such embodiments, cognitive system 126 manages, at least, the ability of computer system 120 to take various actions with respect to one or more physical resources and/or virtual resources. In some embodiments, dimensional analysis program 122 can also embody any combination of the aforementioned elements. To illustrate various aspects of the present invention, examples of dimensional analysis program 122 are presented in which dimensional analysis program 122 includes one or more of, but is not limited to, a user profile request, an entity detection transaction, an artificial neural network (ANN) request, but embodiments of dimensional analysis program 122 are not limited thereto. Embodiments of the present invention recognize that dimensional analysis program 122 may include other forms of transactions that are known in the art.

In various embodiments of the present invention, computer system 120 includes dimensional analysis program 122 which represents an artificial neural network (ANN), wherein the ANN comprises input/output (I/O) data, as well as multiple hidden layers of neurons (i.e., Rectified linear units (RELU) layer). Additionally, cognitive system 126 includes one or more cognitive AI. The present invention recognizes that cognitive system 126 could include any number of cognitive AI, and the present invention is not limited to the embodiment depicted in FIG. 1. Dimensional analysis program 122 analyzes the (i) output data of the multilayer neural network and (ii) the change in the weight output. Dimensional analysis program 122 generates an updated confidence threshold for one or more objects associated with the multimedia. Further, dimensional analysis program 122 determines which supplementary features are associated with the multimedia based on, but not limited to, the identification of the one or more entities (also referred to as "independently separable aspects") within the multimedia.

In various embodiments of the present invention, a user of client device 130 generates a multimedia request, utilizing, at least, client application 132. In various embodiments, the user of client device 130 defines one or more multimedia. In various embodiments, the multimedia include, one or a combination of: (i) cinematic films, (ii) television shows, (iii) musical songs, and other various digital media and pictorial graphics known in the art. Client application 132 executing on client device 130, communicates the multimedia request to computer system 120. In various embodiments, a user of client device 130 uploads one or more multimedia to be communicated to computer system 120 with multimedia request. Additionally, a multimedia request represents a request from a user of client device 130 to computer system 120, wherein computer system 120 analyzes the multimedia and generates an AI search engine based on, but not limited to, machine learning. In some embodiments, a multimedia request includes instruction for dimensional analysis program 122 to retrieve the multimedia stored on database 128.

In various embodiments, routine updates are generated based on, but not limited to, machine learning executed by dimensional analysis program 122. In various embodiments, dimensional analysis program 122 analyzes the multimedia and identifies one or more entities and one or more parameters, as discussed below. In various embodiments, dimensional analysis program 122, in response to identifying (i) one or more entities and (ii) one or more parameters, assigns weights to the one or more entities and assigns the one or more entities to neurons within the feedforward topology. The dimensional analysis program 122 collects output data from the feedforward topology and generates an updated profile for the one or more entities. The updated profile includes, but is not limited to, a threshold value of confidence and the frequency in which the object appears in the multimedia.

In various embodiments, dimensional analysis program 122 executing on computer system 120 receives one or more multimedia requests from client device 130 and various other computing devices (not shown). Additionally, dimensional analysis program 122 retrieves one or more multimedia from database 144 that are associated with the one or more multimedia requests. In some embodiments, dimensional analysis program 122 communicates a set of program instructions to server application 142 instructing server application 142 to retrieve one or more multimedia from database 144 that are associated with the one or more multimedia requests. In response to retrieving the one or more multimedia from database 144, dimensional analysis program 122 analyzes one or more segments of the one or more multimedia. The present invention recognizes that the multimedia includes, but is not limited to, the various digital formats as discussed above. Additionally, the present invention recognizes that (i) cinematic films, (ii) television shows, and (iii) other various pictorial graphics include, but are not limited to, frames of digital images attached in a linear progression. In some embodiments, dimensional analysis program 122 analyzes each individual frame or combination of frames (e.g., a scene from the pictorial graphic).

In various embodiments, dimensional analysis program 122 analyzes the one or more multimedia retrieved from database 144. In various embodiments, dimensional analysis program 122 analyzes the one or more multimedia to identify objects within the multimedia. In some embodiments, dimensional analysis program 122 identifies one or more objects within the multimedia utilizing object identification including, but not limited to, image processing, video processing, computer vision, and convolutional neural networks (CNN). In various embodiments, dimensional analysis program 122 stores the one or more objects identified and the frequency in which the entities appear on database 128.

In various embodiments, dimensional analysis program 122 analyzes the one or more multimedia retrieved from database 144. In various embodiments of the present invention, dimensional analysis program 122 extracts the individual audio file associated with the one or more multimedia. In various embodiments, dimensional analysis program 122 applies noise reduction to the one or more audio files. The present invention recognizes that noise reduction techniques exist for audio and images which alter the signal frequencies to a greater or lesser degree. In various embodiments, dimensional analysis program 122 further applies speech to text software to the one or more multimedia to translate spoken language into text on computer system 120. In various embodiments, dimensional analysis program 122 identifies one or more spoken language words in the one or more multimedia and translate the spoken language to text. In various embodiments, dimensional analysis program 122 stores the one or more translated language on database 128.

In various embodiments, dimensional analysis program 122 analyzes the one or more multimedia retrieved from database 144. In various embodiments of the present invention, dimensional analysis program 122 analyzes the one or more multimedia and identifies one or more subtitles associated with the one or more multimedia. In various embodiments, dimensional analysis program 122 further analyzes the one or more identified subtitles and identifies the text contained with the subtitles. Dimensional analysis program 122 extracts the various identified text and stores the identified text on database 128.

In various embodiments of the present invention, dimensional analysis program 122 retrieves entities of a multimedia file. In various embodiments, dimensional analysis program 122 determines a correlation between the retrieved entities and rates objects contained in the entities on a threshold level of confidence. The present invention recognizes that the one or more entities present in the multimedia represent independently separable aspects of the multimedia. The independently separable aspects include one or a combination of: (i) visual feed (e.g., video, image, etc.), (ii) audio file, or (iii) selected text feed from a closed captioning service.

Dimensional analysis program 122 analyzes the retrieved entities and determines the correlation between entities. In various embodiments, dimensional analysis program 122 analyzes (i) one or more frames, (ii) the translated language, and (iii) the text from the multimedia. In various embodiments, dimensional analysis program 122 determines that a one or more specific objects exist within the frame and the correlation of both (i) translated language and (ii) identified text confirms with a high threshold level of confidence that the one or more objects are present in the frame.

Alternatively, in some embodiments, dimensional analysis program 122 analyzes the entities and determines with a low threshold confidence that one or more objects are present in the frame. Dimensional analysis program 122 leverages (i) the translated language and (ii) the text to further determine if one or more objects are present in the frame at a higher threshold value. In some embodiments, dimensional analysis program 122 identifies one or more parameters that determine that one or more objects are present in the frame at a higher threshold value of confidence. Dimensional analysis program 122 stores this data on database 128. However, in various embodiments, dimensional analysis program 122 leverages (i) the translated language and (ii) the text and is unable to determine that one or more objects are present and maintains the low threshold value of confidence. Dimensional analysis program 122 stores this data on database 128.

In some embodiments, dimensional analysis program 122 leverages the one or more entities (also referred to as "independently separable aspects") that include one or a combination of (i) the one or more frames, (ii) the one or more translated languages, or (iii) the identified text to determine a threshold level of confidence that one or more objects are present in the multimedia. Additionally, in some embodiments, dimensional analysis program 122 leverages the entities to determine one or more objects that include, one or a combination of, (i) pictorial graphic title, (ii) characters, (iii) various objects (e.g., generic household items, furniture, plantae, vehicles, clothing and related accessories, etc.), (iv) actresses, (v) actors, (vi) scene location, etc.

In various embodiments of the present invention, cognitive system 126 generates a multilayer perceptron neural network (MLP) request using a neural network and arranges the data in neurons in a layered feedforward topology. In some embodiments, cognitive system 126 monitors the neurons in the neural network, as each input connects to neurons between, at least, a first layer, one or more hidden layers, and a second layer. Additionally, the activation function of the neural network comprises, at least, a linear function and a non-linear function. One having ordinary skill in the art would understand that the activation function operates within the linear function and non-linear function. One having ordinary skill in the art would understand that the multilayer perceptron neural network arranges input data into a plurality of neurons in the first layer of the neural network and arranges the output data of the first layer into the input of the second layer to create a fully connected neural network. Cognitive system 126 receives output data with weights and thresholds describing the free parameters of the I/O data (e.g., I/O data included in a multimedia request or one or more identified objects). Further, one having ordinary skill in the art would understand that the weights and thresholds describing the free parameters of the I/O data represent the change in the explanatory variables (discussed below) from the input to the output of the MLP. Additionally, one having ordinary skill in the art would understand that the output data reflects the change in the response variables (discussed below) from the input to the output of the MLP.

In various embodiments of the present invention, parameters include, but are not limited to, datasets that provide a standard value for the one or more objects contained within the multimedia. In various embodiments, the parameters represent images, text, or audio that provide a threshold level of confidence of the one or more objects. In one embodiment and example, the parameters represent standards images, text, or audio for a character in a movie. Additionally, the standard images, text, or audio are leveraged to provide a base level for how the object appears or sounds. In various embodiments, the parameters weigh the responsive variables within the hidden layers of the neural network to provide a level of confidence in the output variables.

In one embodiment and example, cognitive system 126 receives I/O data that represents at least a portion of the multimedia request or one or more identified objects. Cognitive system 125 identifies the one or more response variables and the one or more explanatory variables from the multimedia request. Cognitive system 126 receives the identified (i) one or more response variables and (ii) the one or more explanatory variables from the multimedia request. Cognitive system 126 arranges the I/O data into neurons in the first layer of the MLP based on, but not limited to, the multimedia request or identified one or more objects. The I/O data is then transformed through the activation function in the neural network, wherein, the weights and thresholds are connected from, at least, the first layer to a second layer. Embodiments of the present invention are not limited to the first layer and second layer, additionally, embodiments of the invention may contain a plurality of layers within the MLP. The MLP learns, within the perceptron, by changing the weights after each piece of data is processed, based on the amount of error in the output compared with the expected result. Further, the MLP generates a scale numeric value based on the input, which is based on, but is not limited to, the (i) the response variables and (ii) the explanatory variables of the multimedia request or the one or more identified objects. The MLP applies word embedding (e.g., word2vec) to transform a natural language term into one or more numeric variables. Additionally, the MLP applies binary coding to the one or more number variables to generate a plurality of scaled numeric variables. The scaled numeric variables represent the change in the explanatory variables as the output of the MLP. In various embodiments, dimensional analysis program 122 receives the scaled numeric variables (e.g., change in the explanatory variables) and analyzes the change in the data. Dimensional analysis program 122 determines whether to apply the data to a linear regression profile or a non-linear regression profile based on, but not limited to, the change in the explanatory variables. Dimensional analysis program 122 monitors the output data of the MLP. Dimensional analysis program 122 analyzes the data and determines the level of confidence for the one or more objects. Dimensional analysis program 122 collects the confidence levels of the one or more objects and generates a multimedia search engine. Dimensional analysis program 122 communicates the multimedia search engine to client application 132 with program instructions instructing client application 132 to populate the multimedia search engine on client interface 134 with instructions on how to coach the user of client device 130 to navigate the multimedia engine. Dimensional analysis program 122 monitors the activity of the MLP and routinely updates the multimedia search engine based on, but not limited to, an updated confidence level of one or more objects associated with the one or more entities within the multimedia.

In one embodiment of the present invention, dimensional analysis program 122 identifies a plurality of independently separable aspects of a multimedia file. Dimensional analysis program 122 provides at least one independently separable aspect of the plurality of independently separable aspects as input into an object detection model. Dimensional analysis program 122 receives from the object detection model, an identification of at least one object and a corresponding level of confidence that the object is present in the multimedia file. Dimensional analysis program 122 classifies the object as either confident or not confident, based on whether the level of confidence meets a threshold level of confidence. Dimensional analysis program 122 generates a multimedia search engine based, at least in part, on the object and the classification.

In one embodiment of the present invention, the plurality of independently separable aspects include an audio feed, a video feed, and a text feed, wherein the text feed is received from a closed captioning service.

In one embodiment of the present invention, the corresponding level of confidence that the object is present in the multimedia file is based, at least in part, on a determined correlation between at least two independently separable aspects of the plurality of independently separable aspects.

In one embodiment of the present invention, the object detection model includes a trained artificial neural network.

In one embodiment of the present invention, in response to dimensional analysis program 122 classifying the object as not confident, dimensional analysis program 122 provides the at least one independently separable aspect to an annotator for manual annotation. Dimensional analysis program 122 receives an annotation indicating that the object is present in the multimedia file.

In one embodiment of the present invention, in response to dimensional analysis program 122 receiving the annotation indicating that the object is present in the multimedia file, dimensional analysis program 122 trains the object detection model utilizing the object and the annotation.

In one embodiment of the present invention, in response to dimensional analysis program 122 receiving the annotation indicating that the object is present in the multimedia file, dimensional analysis program 122 updates the multimedia search engine based, at least in part, on the object and the annotation.

Figure 2:
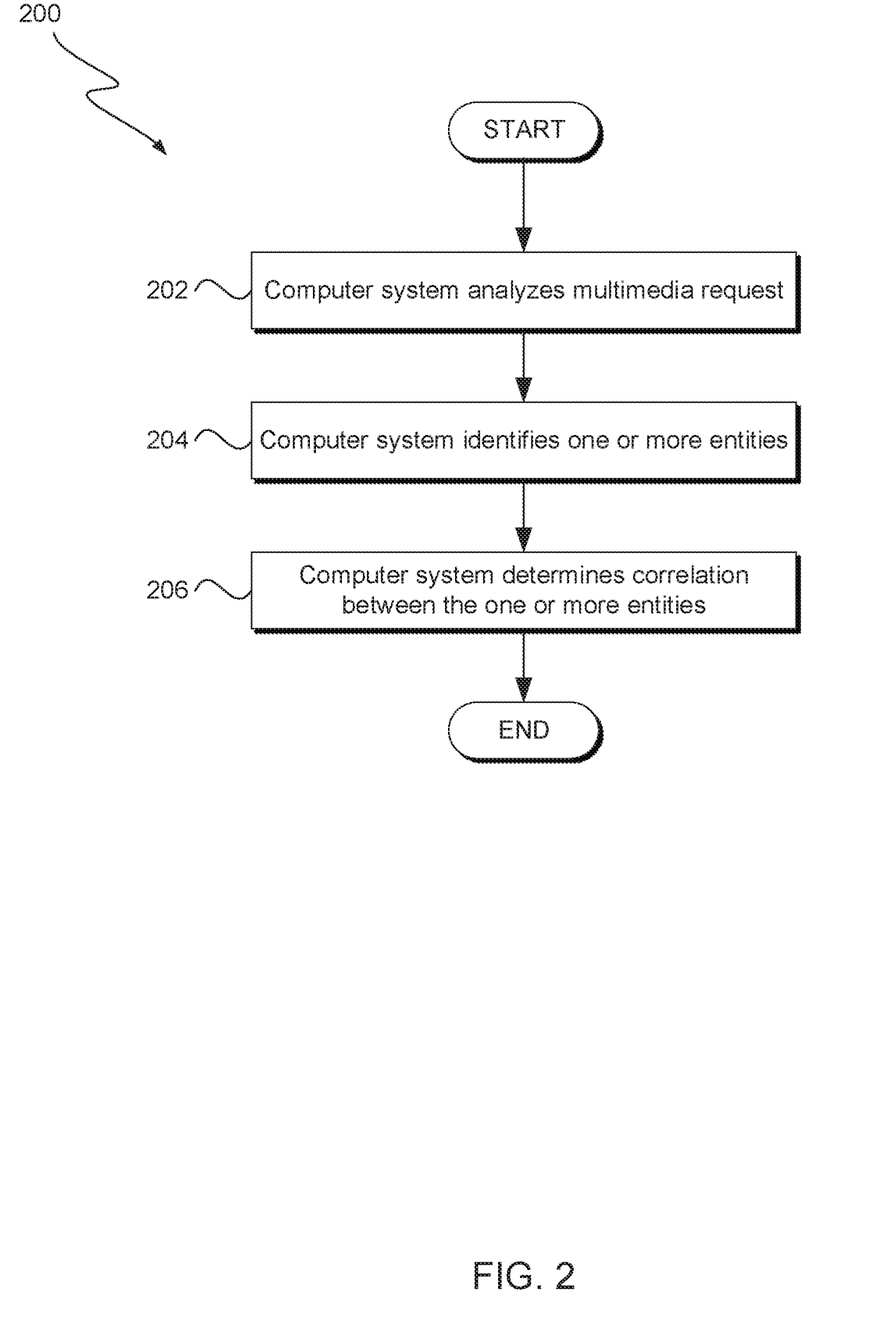
FIG. 2 illustrates operational processes of executing a system for a multimedia search engine, on a computing device within the environment of FIG. 1, in accordance with an exemplary embodiment of the present invention.

FIG. 2 is a flowchart, 200 depicting operations of dimensional analysis program 122 in computing environment 100, in accordance with an illustrative embodiment of the present invention. FIG. 2 also represents certain interactions between dimensional analysis program 122 and client program 132. In some embodiments, the operations depicted in FIG. 2 incorporate the output of certain logical operations of dimensional analysis program 122 executing on computer system 120. It should be appreciated that FIG. 2 provides an illustration of one implementation and does not imply any limitations with regard to the environments in which different embodiments may be implemented. Many modifications to the depicted environment may be made. In one embodiment, the series operations depicted in FIG. 2 can be performed in any order. In another embodiment, the series of operations, depicted in FIG. 2, can be performed simultaneously. Additionally, the series of operations, depicted in FIG. 2, can be terminated at any operation. In addition to the features previously mentioned, any operations, depicted in FIG. 2, can be resumed at any time.

In operation 202, dimensional analysis program 122 receives one or more multimedia requests from client device 130 and analyzes the one or more multimedia requests. In various embodiments, dimensional analysis program 122 retrieves one or more multimedia from database 144 and analyze the one or more multimedia. In some embodiments, the one or more multimedia requests instruct dimensional analysis program 122 to identify one or more entities (also referred to as "independently separable aspects") within the one or more multimedia.

In operation 204, dimensional analysis program 122 identifies one or more entities within the one or more multimedia. In various embodiments, dimensional analysis program 122 identifies one or more entities that include one or a combination of, (i) one or more frames, (ii) one or more translated languages, or (iii) one or more identified text. In various embodiments, dimensional analysis program 122 further analyzes the one or more entities to identify one or more objects within the one or more multimedia.

In operation 206, dimensional analysis program 122 determines the correlation between the one or more entities identified within the multimedia. In various embodiments, dimensional analysis program 122 identifies one or more objects within the multimedia. The present invention recognizes that dimensional analysis program 122 identifies the one or more objects based on, but not limited to, the one or more entities. Dimensional analysis program 122 further determines the threshold level of confidence that the one or more objects exist within the one or more multimedia. In various embodiments, dimensional analysis program 122 further determines the threshold level of confidence that the one or more objects exist within one or more frames associated with multimedia. Additionally, the determination is based on, but is not limited to, the identification of the correlation between the one or more entities. In various embodiments, dimensional analysis program 122 utilizes the one or more entities to generate a correlation between the one or more objects identified in the one or more multimedia.

In various embodiments of the present invention, dimensional analysis program 122 leverages the one or more entities (also referred to as "independently separable aspects") that include one or a combination of (i) the one or more frames, (ii) the one or more translated languages, or (iii) the identified text, to determine a threshold level of confidence that one or more objects are present in the multimedia. Additionally, in some embodiments, dimensional analysis program 122 leverages the entities to determine one or more objects that include one or a combination of (i) pictorial graphic title, (ii) characters, (iii) various objects (e.g., generic household items, furniture, plantae, vehicles, clothing and related accessories, etc.), (iv) actresses, (v) actors, (vi) scene location, etc.

Figure 3:
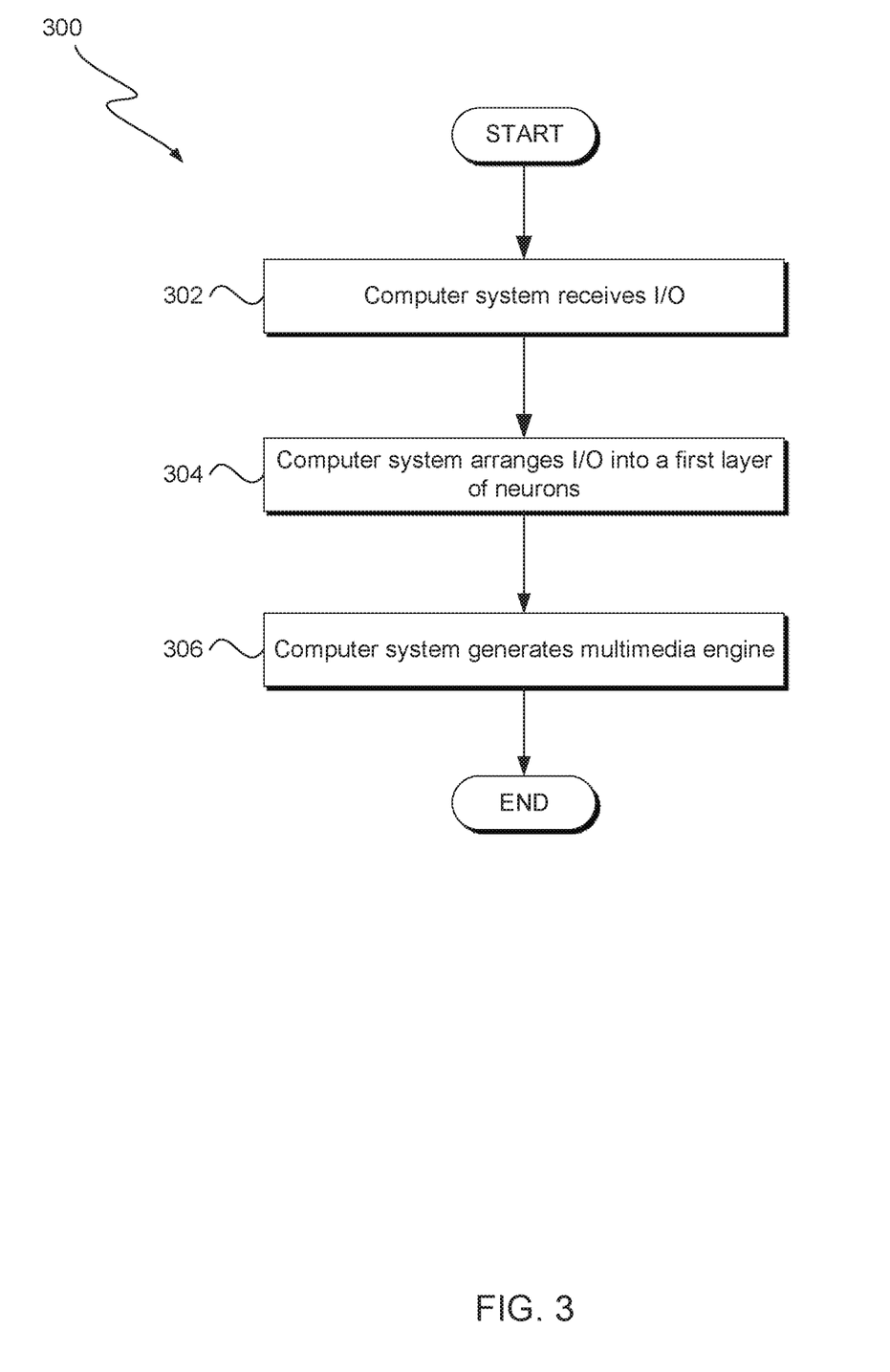
FIG. 3 illustrates operational processes of executing a system for a multimedia search engine, on a computing device within the environment of FIG. 1, in accordance with an exemplary embodiment of the present invention.

FIG. 3 is a flowchart depicting operations for generating, modifying, leveraging, and/or executing a multilayer perceptron neural network for computing environment 100, in accordance with an illustrative embodiment of the present invention. More specifically, in this embodiment, FIG. 3, depicts overall operations, 300, of cognitive system 126 executing on computer system 120. FIG. 3 also represents certain interactions between cognitive system 126 and dimensional analysis program 122. In some embodiments, some or all of the operations depicted in FIG. 3 represent logical operations of cognitive system 126 executing on computer system 120. Further operations 300 can include a portion or all of combined overall operations of 200. In various embodiments, the series of operations 300 can be performed simultaneously with operations 200. It should be appreciated that FIG. 3 provides an illustration of one implementation and does not imply any limitations with regard to the environments in which different embodiments may be implemented. Many modifications to the depicted environment may be made. In one embodiment, the series of operations depicted in FIG. 3 can be performed in any order. In another the series of operations, depicted in FIG. 3, can be performed simultaneously. Additionally, the series of operations, depicted in FIG. 3, can be terminated at any operations. In addition to the features mentioned, any operations, depicted in FIG. 3, can be resumed at any time.

In operation 302, dimensional analysis program 122 receives I/O, as recognized above, from client device 130 and SAN 140 over network 110. The I/O may include (i) one or more response variables (e.g., one or more multimedia requests and one or more entities (also referred to as "independently separable aspects")) and (ii) one or more explanatory variables (e.g., one or more parameters) of an MLP request. Dimensional analysis program 122 analyzes the I/O (e.g., response variables and the explanatory variables) and communicates the I/O to cognitive system 126. In various embodiments of the present invention, cognitive system receives the I/O from dimensional analysis program 122 and cognitive system 126 prepares the analyzed I/O to be placed in the multilayer perceptron layered feedforward topology neural network.

In operation 304, cognitive system 126 arranges the I/O in neurons located on the multilayer perceptron layered feedforward topology neural network. In various embodiments, cognitive system 126 arranges the data in, at least, a first layer. The input data in the first layer of the MLP is weighted by the explanatory variables of the MLP request. As one having ordinary skill in the art would understand, the MLP combines the input variables with the one or more weighted sums, and the input variables are fed through the net input function and are summed. Cognitive system 126 retrieves the net input function sum. In one embodiment, cognitive system 126 analyzes the net input function (e.g., confident object). In various embodiments, cognitive system 126 determines whether, based on the value produced from the net input, the input-weight variables should progress through another layer (e.g., to determine whether the confidence level of an object meets a threshold level of confidence that the object appears in, at least, the analyzed entity). In various embodiments, cognitive system 126 determines that the input-weight variables should pass through, at least, one or more layers. In some embodiments, cognitive system 126 prepares the input-weight variables and places this data into the neurons of the, at least, one more layer, wherein the input-weight variables traverse the same calculation, as mentioned above. Cognitive system 126 retrieves the input-weight variables from the, at least, one more layer and further analyzes the input-weight variables (e.g., the I/O). In some embodiments, cognitive system 126 determines that the input-weight variables from the, at least, first layer are sufficient and cognitive system 126 stores the data on database 128 and/or database 144. The layer in the neural network provide deep learning abilities for cognitive system 126 and are leveraged to identify a pattern of parameters in the, at least, (i) one or more multimedia requests and (ii) the one or more entities.

In various embodiments, cognitive system 126 monitors the (i) inputs and outputs of the data in the layered feedforward topology and (ii) the weight level in the layered feedforward topology. In one embodiment and example, dimensional analysis program 122 receives the (i) input and outputs of the data in the layered feedforward topology and (ii) the weight level in the layered feedforward topology from cognitive system 126, and dimensional analysis program 122 identifies a level of confidence of one or more objects from the data in the layered feedforward topology. In some embodiments, dimensional analysis program 122 identifies the data in the layered feedforward topology that indicates the highest threshold level of confidence for one or more objects. In various embodiments, cognitive system 126 receives the data and program instructions from dimensional analysis program 122 indicating the threshold level of confidence for one or more objects. Cognitive system 126 retrieves the output data from the layered feedforward topology and communicates the data dimensional analysis program 122, wherein, dimensional analysis program 122 further analyzes the data.

In operation 306, cognitive system 126 communicates output data from the MLP to dimensional analysis program 122. In various embodiments of the present invention, dimensional analysis program 122 analyzes (i) the output data form the MLP and (ii) the one or more identified objects and generates a multimedia search engine. In various embodiments, the multimedia search engine represents a search engine that includes, one or a combination of, (i) a GUI, (ii) software application, (iii) one or more graphical control elements, (iv) one or more text boxes, and (v) one or more search fields. Additionally, dimensional analysis program 22 communicates the multimedia search engine to client application 132 with program instructions instructing client application 132 to populate the multimedia search engine on client interface 134. In various embodiments, the multimedia search engine is populated for a user of client device 130 and coaches the user of client device 130 to interact with the multimedia search engine utilizing (i) the one or more graphical control elements, (ii) the one or more text boxes, and (iii) the one or more search fields.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned model may include at least five characteristics, at least three service models, and at least four deployment models.

Characteristics are as follows:

On-demand self-service: a cloud consumer can unilaterally provision computing capabilities, such as server-time and network storage, as needed automatically without requiring human interaction with the service's provider.

Broad network access: capabilities are available over a network and accessed through standard mechanisms that promote use by heterogeneous thin or thick client platforms 9 e.g., mobile phones, laptops and PDAs).

Resource pooling: the provider's computing resources are pooled to serve multiple consumer using a multi-tenant model, with different physical and virtual resources dynamically assigned and reassigned according to demand. There is a sense of location independence in that the consumer generally has not control or knowledge over the exact locations of the provided resources but may be able to specify location at a higher level of abstraction (e.g., country, state, or datacenter).

Rapid elasticity: capabilities can be rapidly and elasticity provisioned, in some cases automatically, to quickly scale out and rapidly released to quickly scale in. To the consumer, the capabilities available for provisioning often appear to be unlimited and can be purchased in any quality at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual applications capabilities, with the possible exception of limited user-specific application configuration settings.

Platform as a Service (PaaS): the capability provided to the consumers to deploy onto the cloud infrastructure consumer-created or acquired applications created using programming languages and tools supported by the provider.

The consumer does not manage or control the underlying cloud infrastructure including networks, servers, operating systems, or storage, but has control over the deployed applications and possibly application hosting environmental configurations.

Infrastructure as a Service (IaaS): the capability provided to the consumer to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or large industry group and is owned by an organization selling cloud services.

Hybrid cloud: the cloud infrastructure is a composition of two or more cloud (private, community or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
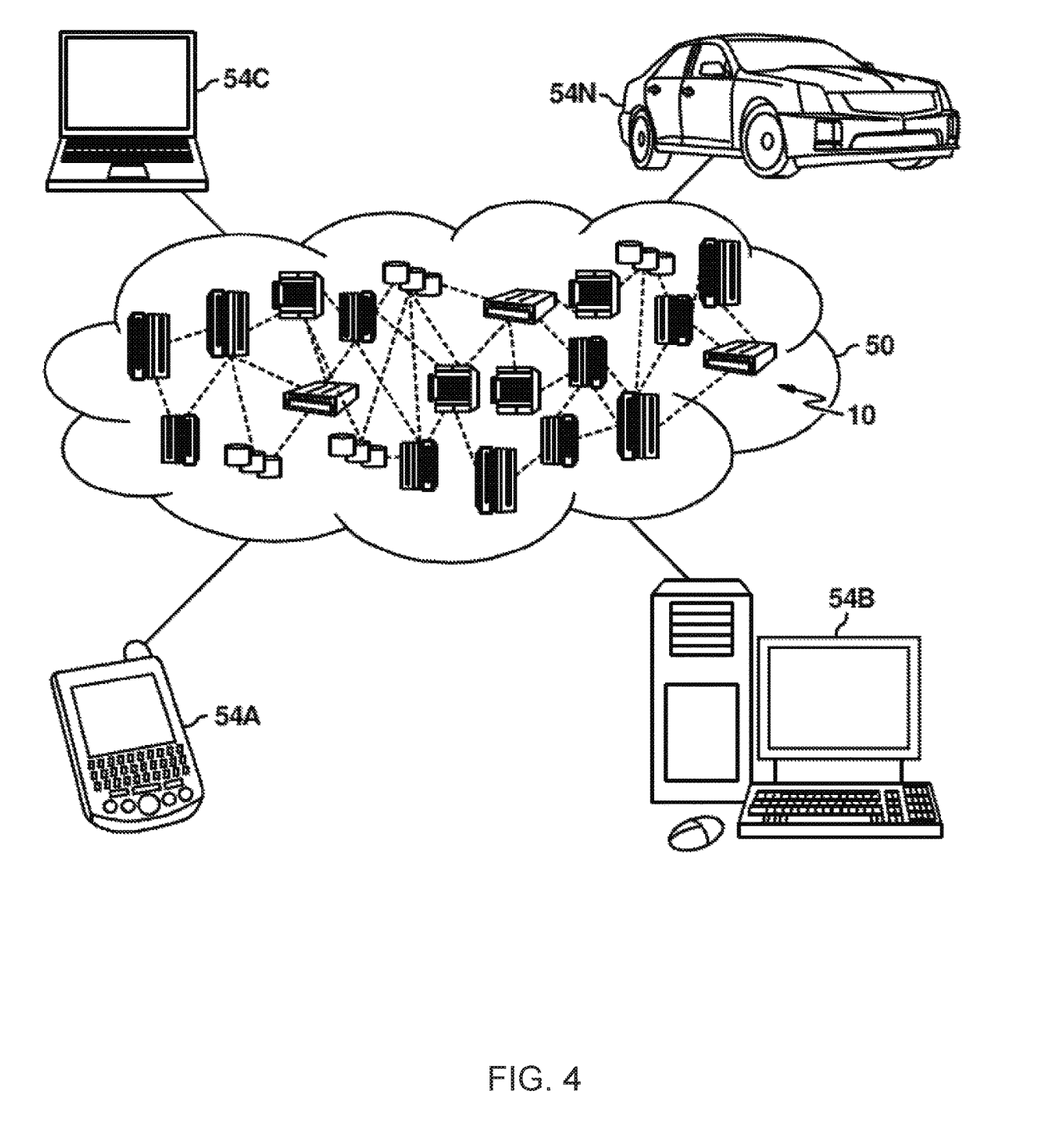
FIG. 4 depicts a cloud computing environment according to at least one embodiment of the present invention.

Referring now to FIG. 4, illustrative cloud computing environment 50 is depicted. As shown, cloud computing environment 50 includes one or more cloud computing nodes 10 with which local computing devices used by cloud consumer: such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
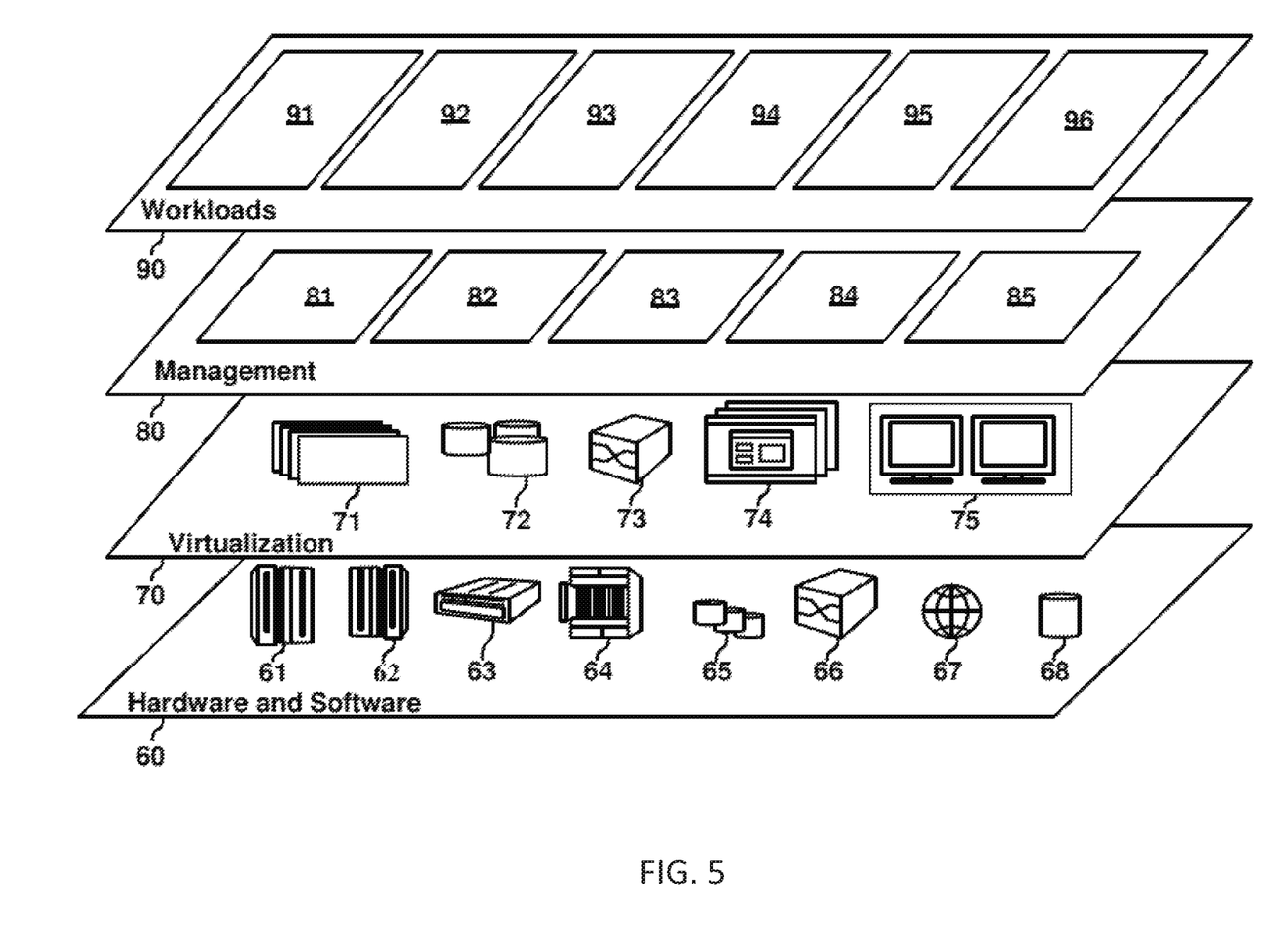
FIG. 5 depicts abstraction model layers according to at least on embodiment of the present invention.

Referring now to FIG. 5, a set of functional abstraction layers provided by cloud computing environment 50 (FIG. 5) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instructions Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73; including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include applications software licenses. Security provides identity verification for cloud consumers and tasks, as well as protection for data and other resources. User portal 81 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and providing soothing output 96.

Figure 6:
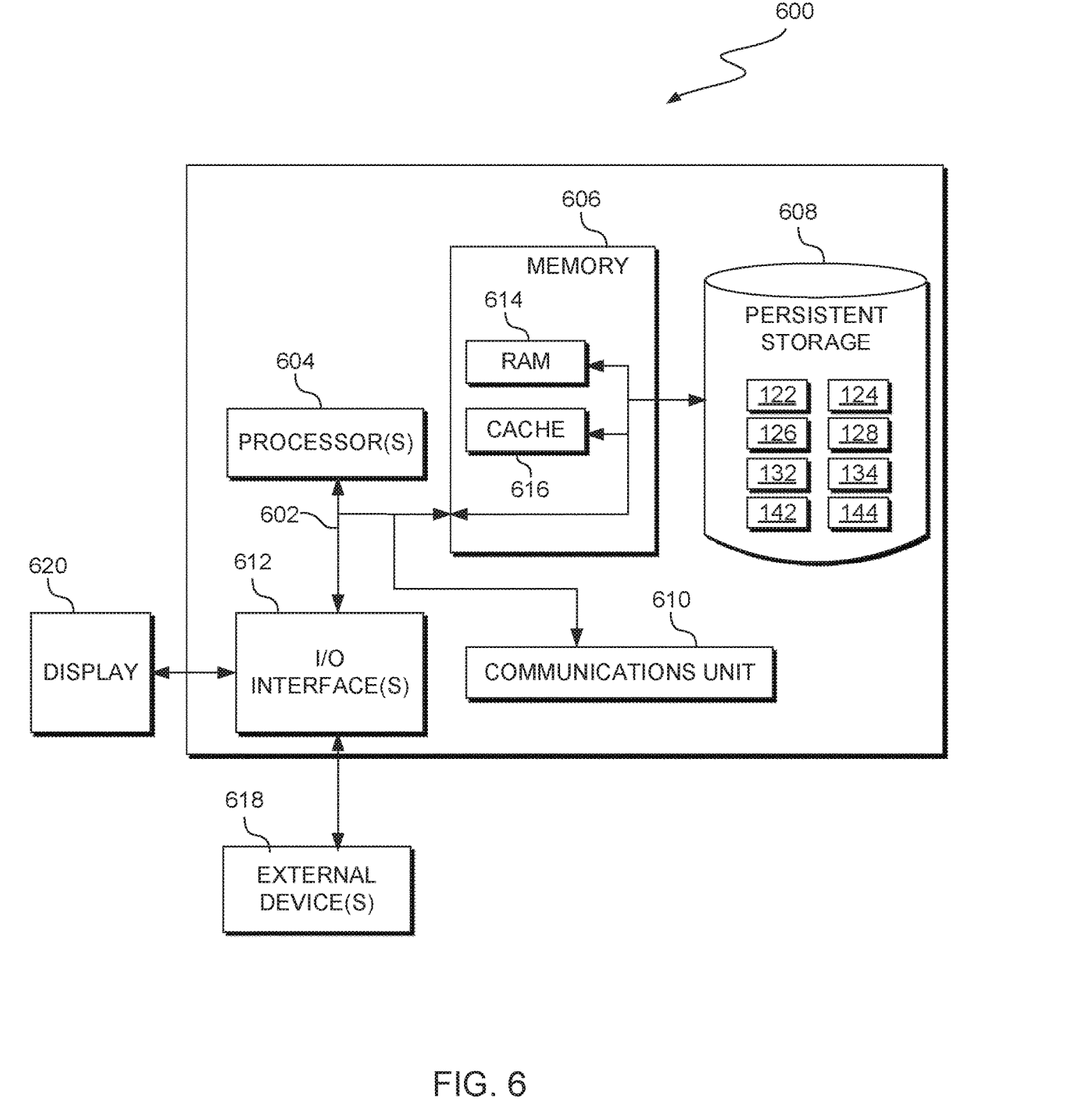
FIG. 6 depicts a block diagram of components of one or more computing devices within the computing environment depicted in FIG. 1, in accordance with an exemplary embodiment of the present invention.

FIG. 6 depicts a block diagram, 600, of components of computer system 120, client device 130, and SAN 140, in accordance with an illustrative embodiment of the present invention. It should be appreciated that FIG. 6 provides only an illustration of one implementation and does not imply any limitations with regard to the environments in which different embodiments may be implemented. Many modifications to the depicted environment may be made.

Computer system 120, client device 130, and SAN 140 includes communications fabric 602, which provides communications between computer processor(s) 604, memory 606, persistent storage 608, communications unit 610, and input/output (I/O) interface(s) 612. Communications fabric 602 can be implemented with any architecture designed for passing data and/or control information between processors (such as microprocessors, communications and network processors, etc.), system memory, peripheral devices, and any other hardware components within a system. For example, communications fabric 602 can be implemented with one or more buses.

Memory 606 and persistent storage 608 are computer-readable storage media. In this embodiment, memory 606 includes random access memory (RAM) 614 and cache memory 616. In general, memory 606 can include any suitable volatile or non-volatile computer-readable storage media.

Dimensional analysis program 122, computer interface 124, cognitive system 126, database 128, client application 132, client interface 134, server application 142, and database 144 are stored in persistent storage 608 for execution and/or access by one or more of the respective computer processors 604 via one or more memories of memory 606. In this embodiment, persistent storage 608 includes a magnetic hard disk drive. Alternatively, or in addition to a magnetic hard disk drive, persistent storage 608 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 608 may also be removable. For example, a removable hard drive may be used for persistent storage 608. Other examples include optical and magnetic disks, thumb drives, and smart cards that are inserted into a drive for transfer onto another computer-readable storage medium that is also part of persistent storage 608.

Communications unit 610, in these examples, provides for communications with other data processing systems or devices, including resources of network 110. In these examples, communications unit 610 includes one or more network interface cards. Communications unit 610 may provide communications through the use of either or both physical and wireless communications links. Dimensional analysis program 122, computer interface 124, cognitive system 126, database 128, client application 132, client interface 134, server application 142, and database 144 may be downloaded to persistent storage 608 through communications unit 610.

I/O interface(s) 612 allows for input and output of data with other devices that may be connected to computer system 120, client device 130, and SAN 140. For example, I/O interface 612 may provide a connection to external devices 618 such as a keyboard, keypad, a touch screen, and/or some other suitable input device. External devices 618 can also include portable computer-readable storage media such as, for example, thumb drives, portable optical or magnetic disks, and memory cards. Software and data used to practice embodiments of the present invention, e.g., dimensional analysis program 122, computer interface 124, cognitive system 126, database 128, client application 132, client interface 134, server application 142, and database 144, can be stored on such portable computer-readable storage media and can be loaded onto persistent storage 608 via I/O interface(s) 612. I/O interface(s) 612 also connect to a display 620.

Display 620 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) such as, for example, "Smalltalk" and the like may be subject to trademark rights in various jurisdictions throughout the world and are used here only in reference to the products or services properly denominated by the marks to the extent that such trademark rights may exist.

What is claimed is:

1. A computer-implemented method comprising:
   identifying, by one or more computer processors, a plurality of independently separable aspects of a multimedia file, the plurality of independently separable aspects including at least an image and closed captioning text associated with the image;
   determining, by the one or more computer processors, a correlation between the image and the closed captioning text;
   providing, by the one or more computer processors, the image and the closed captioning text as input into an object detection model;
   generating, by the one or more computer processors, a multilayer perceptron neural network configured to determine a level of confidence that an object is present in the multimedia file based on a stream of explanatory variables;
   based, at least in part, on an output from the object detection model, output from the multilayer perceptron neural network, and on the correlation between the image and the closed captioning text, identifying, by the one or more processors, the object and the level of confidence that the object is present in the multimedia file;
   classifying, by the one or more computer processors, the object as either confident or uncertain to generate a classification of the object, based on whether the level of confidence that the object is present in the multimedia file meets a threshold for the level of confidence that the object is present in the multimedia file;
   monitoring the multilayer perceptron neural network for a change in the stream of explanatory variables;
   generating, by the one or more processors, an updated level of confidence that the object is present in the multimedia file based, at least in part, on the change in the stream of explanatory files;
   generating, by the one or more processors, an updated classification of the object based, at least in part, on the change in the stream of explanatory files; and
   generating, by the one or more computer processors, a multimedia search engine based, at least in part, on the updated level of confidence that the object is present in the multimedia file and the updated classification of the object.

2. The computer-implemented method of claim 1, wherein the plurality of independently separable aspects further includes an audio feed and a video feed.

3. The computer-implemented method of claim 1, wherein the object detection model includes a trained artificial neural network.

4. The computer-implemented method of claim 1, further comprising:
   in response to classifying the object as uncertain, providing, by the one or more processors, the image and the closed captioning text to an annotator for manual annotation; and
   receiving, by the one or more processors, an annotation indicating that the object is present in the multimedia file.

5. The computer-implemented method of claim 4, further comprising:
   in response to receiving the annotation indicating that the object is present in the multimedia file, training, by the one or more processors, the object detection model utilizing the object and the annotation.

6. The computer-implemented method of claim 4, further comprising:
   in response to receiving the annotation indicating that the object is present in the multimedia file, updating, by the one or more computer processors, the multimedia search engine based, at least in part, on the object and the annotation.

7. A computer program product comprising:
one or more non-transitory computer-readable storage media and program instructions stored on the one or more non-transitory computer-readable storage media, the stored program instructions comprising:
program instructions to identify a plurality of independently separable aspects of a multimedia file, the plurality of independently separable aspects including at least an image and closed captioning text associated with the image;
program instructions to determine a correlation between the image and the closed captioning text;
program instructions to provide the image and the closed captioning text as input into an object detection model;
program instructions to generate a multilayer perceptron neural network configured to determine a level of confidence that an object is present in the multimedia file based on a stream of explanatory variables;
program instructions to, based, at least in part, on an output from the object detection model, output from the multilayer perceptron neural network, and on the correlation between the image and the closed captioning text, identify the object and the level of confidence that the object is present in the multimedia file;
program instructions to classify the object as either confident or uncertain to generate a classification of the object not confident, based on whether the level of confidence that the object is present in the multimedia file meets a threshold for the level of confidence that the object is present in the multimedia file;
program instructions to monitor the multilayer perceptron neural network for a change in the stream of explanatory variables;
program instructions to generate an updated level of confidence that the object is present in the multimedia file based, at least in part, on the change in the stream of explanatory files:
program instructions to generate an updated classification of the object based, at least in part, on the change in the stream of explanatory files; and
program instructions to generate a multimedia search engine based, at least in part, on the updated level of confidence that the object is present in the multimedia file and the updated classification of the object.

8. The computer program product of claim 7, wherein the plurality of independently separable aspects further includes an audio feed and a video feed.

9. The computer program product of claim 7, wherein the object detection model includes a trained artificial neural network.

10. The computer program product of claim 7, the stored program instructions further comprising:
program instructions to, in response to classifying as uncertain, provide the image and the closed captioning text to an annotator for manual annotation; and
program instructions to receive an annotation indicating that the object is present in the multimedia file.

11. The computer program product of claim 10, the stored program instructions further comprising:
program instructions to, in response to receiving the annotation indicating that the object is present in the multimedia file, train the object detection model utilizing the object and the annotation.

12. The computer program product of claim 11, the stored program instructions further comprising:
program instructions to, in response to receiving the annotation indicating that the object is present in the multimedia file, update the multimedia search engine based, at least in part, on the object and the annotation.

13. A computer system, the computer system comprising:
one or more computer processors;
one or more non-transitory computer readable storage medium; and
program instructions stored on the non-transitory computer readable storage medium for execution by at least one of the one or more processors, the stored program instructions comprising:
program instructions to identify a plurality of independently separable aspects of a multimedia file, the plurality of independently separable aspects including at least an image and closed captioning text associated with the image;
program instructions to determine a correlation between the image and the closed captioning text;
program instructions to provide the image and the closed captioning text as input into an object detection model;
program instructions to generate a multilayer perceptron neural network configured to determine a level of confidence that an object is present in the multimedia file based on a stream of explanatory variables;
program instructions to, based, at least in part, on an output from the object detection model, output from the multilayer perceptron neural network, and on the correlation between the image and the closed captioning text, identify the object and the level of confidence that the object is present in the multimedia file;
program instructions to classify the object as either confident or uncertain to generate a classification of the object , based on whether the level of confidence that the object is present in the multimedia file meets a threshold for the level of confidence that the object is present in the multimedia file;
program instructions to monitor the multilayer perceptron neural network for a change in the stream of explanatory variables;
program instructions to generate an updated level of confidence that the object is present in the multimedia file based, at least in part, on the change in the stream of explanatory files;
program instructions to generate an updated classification of the object based, at least in part, on the change in the stream of explanatory files; and
program instructions to generate a multimedia search engine based, at least in part, on the updated level of confidence that the object is present in the multimedia file and the updated classification of the object.

14. The computer system of claim 13, wherein the object detection model includes a trained artificial neural network.

15. The computer system of claim 13, the stored program instructions further comprising:
program instructions to, in response to classifying the object as uncertain, provide the image and the closed captioning text to an annotator for manual annotation; and
program instructions to receive an annotation indicating that the object is present in the multimedia file.

16. The computer system of claim 15, the stored program instructions further comprising:
program instructions to, in response to receiving the annotation indicating that the object is present in the multimedia file, train the object detection model utilizing the object and the annotation.

17. The computer system of claim 15, the stored program instructions further comprising;
program instructions to, in response to receiving the annotation indicating that the object is present in the multimedia file, update the multimedia search engine based, at least in part, on the object and the annotation.

18. The computer-implemented method of claim 5, wherein the training of the object detection model further utilizes the correlation between the image and the closed captioning text.

19. The computer program product of claim 11, wherein the training of the object detection model further utilizes the correlation between the image and the closed captioning text.

20. The computer system of claim 16, wherein the training of the object detection model further utilizes the correlation between the image and the closed captioning text.

* * * * *